(12) United States Patent
Baudasse et al.

(10) Patent No.: US 9,669,949 B2
(45) Date of Patent: Jun. 6, 2017

(54) TAPE SPRING DEPLOYABLE STRUCTURE

(71) Applicant: THALES, Courbevoie (FR)

(72) Inventors: Yannick Baudasse, Cannes la Bocca (FR); Stéphane Vezain, Cannes la Bocca (FR); François Guinot, Cannes la Bocca (FR)

(73) Assignee: THALES, Courbevoie (FR)

( * ) Notice: Subject to any disclaimer, the term of this patent is extended or adjusted under 35 U.S.C. 154(b) by 155 days.

(21) Appl. No.: 14/805,317

(22) Filed: Jul. 21, 2015

(65) Prior Publication Data

US 2016/0023781 A1   Jan. 28, 2016

(30) Foreign Application Priority Data

Jul. 25, 2014   (FR) ..................... 14 01712

(51) Int. Cl.
  *B64G 1/22*   (2006.01)
  *B64G 1/44*   (2006.01)
  *E04C 3/00*   (2006.01)
  *B65H 75/28*   (2006.01)
  *B65H 75/44*   (2006.01)

(52) U.S. Cl.
  CPC .............. *B64G 1/222* (2013.01); *B64G 1/44* (2013.01); *B65H 75/28* (2013.01); *B65H 75/285* (2013.01); *B65H 75/4402* (2013.01); *E04C 3/005* (2013.01); *B65H 2701/373* (2013.01); *B65H 2701/528* (2013.01)

(58) Field of Classification Search
  CPC . B64G 1/22; B64G 1/222; B64G 1/44; B65H 75/28; B65H 75/285; B65H 75/00; B65H 75/4402; B65H 2701/37; B65H 2701/373; H01Q 1/1235; H01Q 1/288; H01Q 1/28; H01Q 1/281; H01Q 1/282; H01Q 7/02; E04C 3/00; E04C 3/005
  USPC ..... 244/173.3; 343/705, 707, 711, 713, 715, 343/717, DIG. 2
  See application file for complete search history.

(56) References Cited

U.S. PATENT DOCUMENTS

| | | | | |
|---|---|---|---|---|
| 3,544,041 | A * | 12/1970 | Billerbeck, Jr. ........ | B64G 1/222 136/245 |
| 4,506,446 | A | 3/1985 | Mitchell | |
| 7,856,735 | B2 | 12/2010 | Allezy et al. | |
| 8,683,755 | B1 * | 4/2014 | Spence .................. | B64G 1/222 136/245 |
| 2002/0112417 | A1 * | 8/2002 | Brown .................... | B64G 1/222 52/108 |
| 2009/0138625 | A1 * | 5/2009 | Lee ........................ | G06F 9/4812 710/23 |
| 2014/0151485 | A1 | 6/2014 | Baudasse et al. | |

FOREIGN PATENT DOCUMENTS

| | | |
|---|---|---|
| FR | 1 591 682 A | 5/1970 |
| FR | 2 998 876 A1 | 6/2014 |
| GB | 2 216 870 A | 10/1989 |

* cited by examiner

*Primary Examiner* — Jessica Laux
(74) *Attorney, Agent, or Firm* — Baker & Hostetler LLP

(57) ABSTRACT

A deployable structure comprises: a support, a tape spring fixed to the support, able to pass from a wound configuration wound about an axis Z, to a deployed configuration, and a mobile arm able to rotate with respect to the support about the Z-axis, able to form a first contact with the tape spring so as to control the deployment of the tape spring.

5 Claims, 11 Drawing Sheets

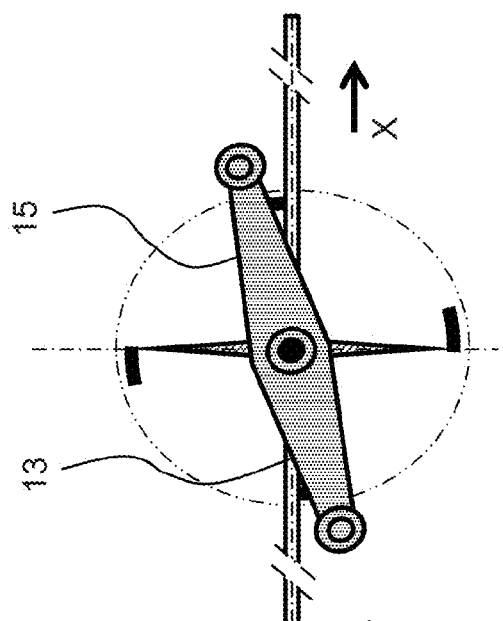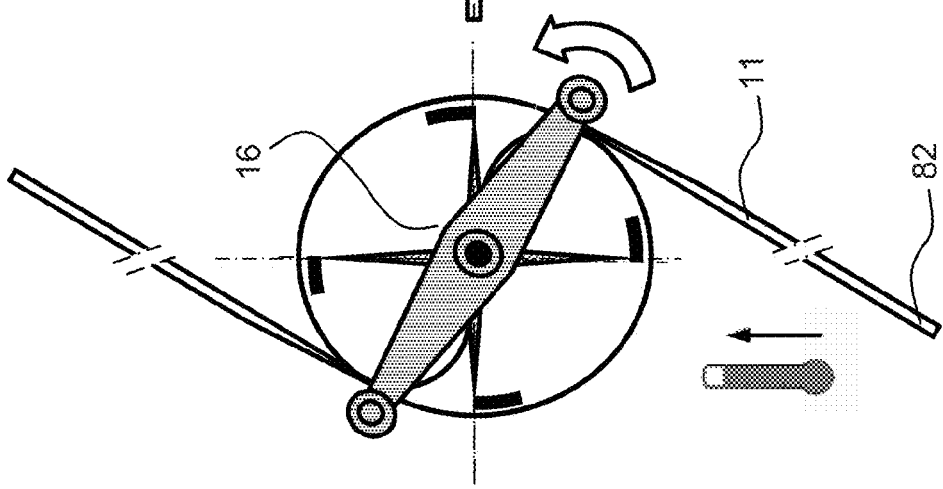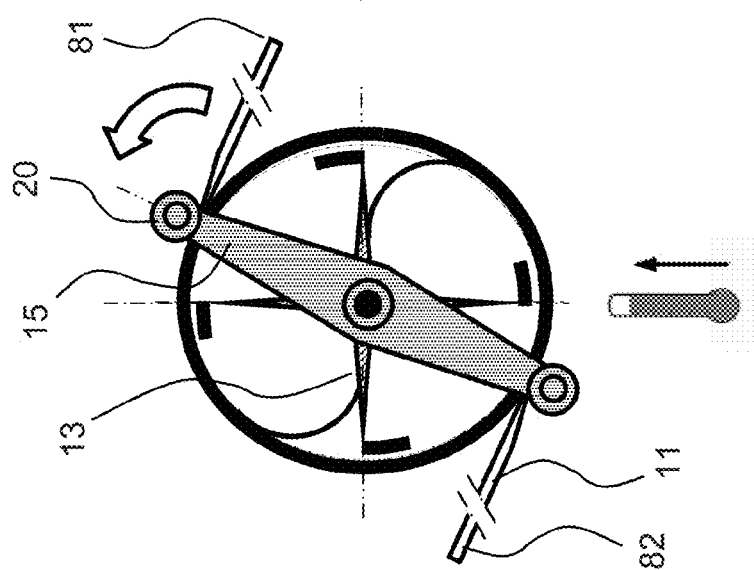

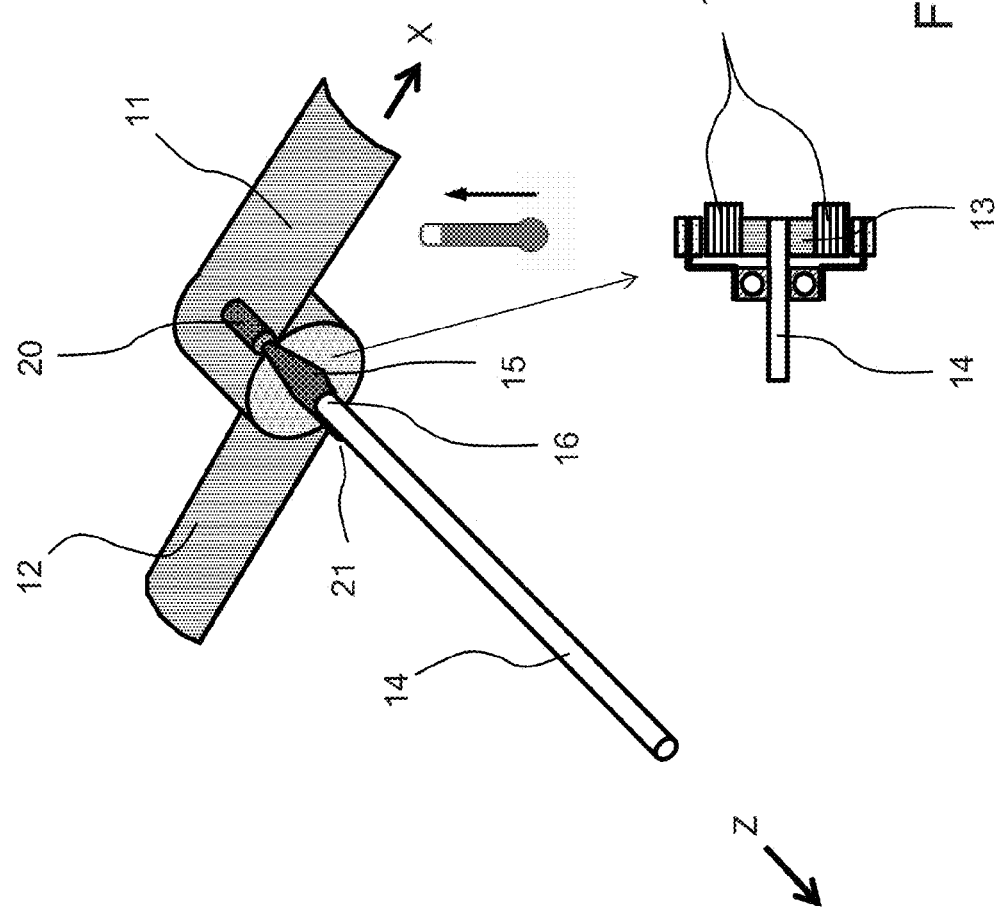

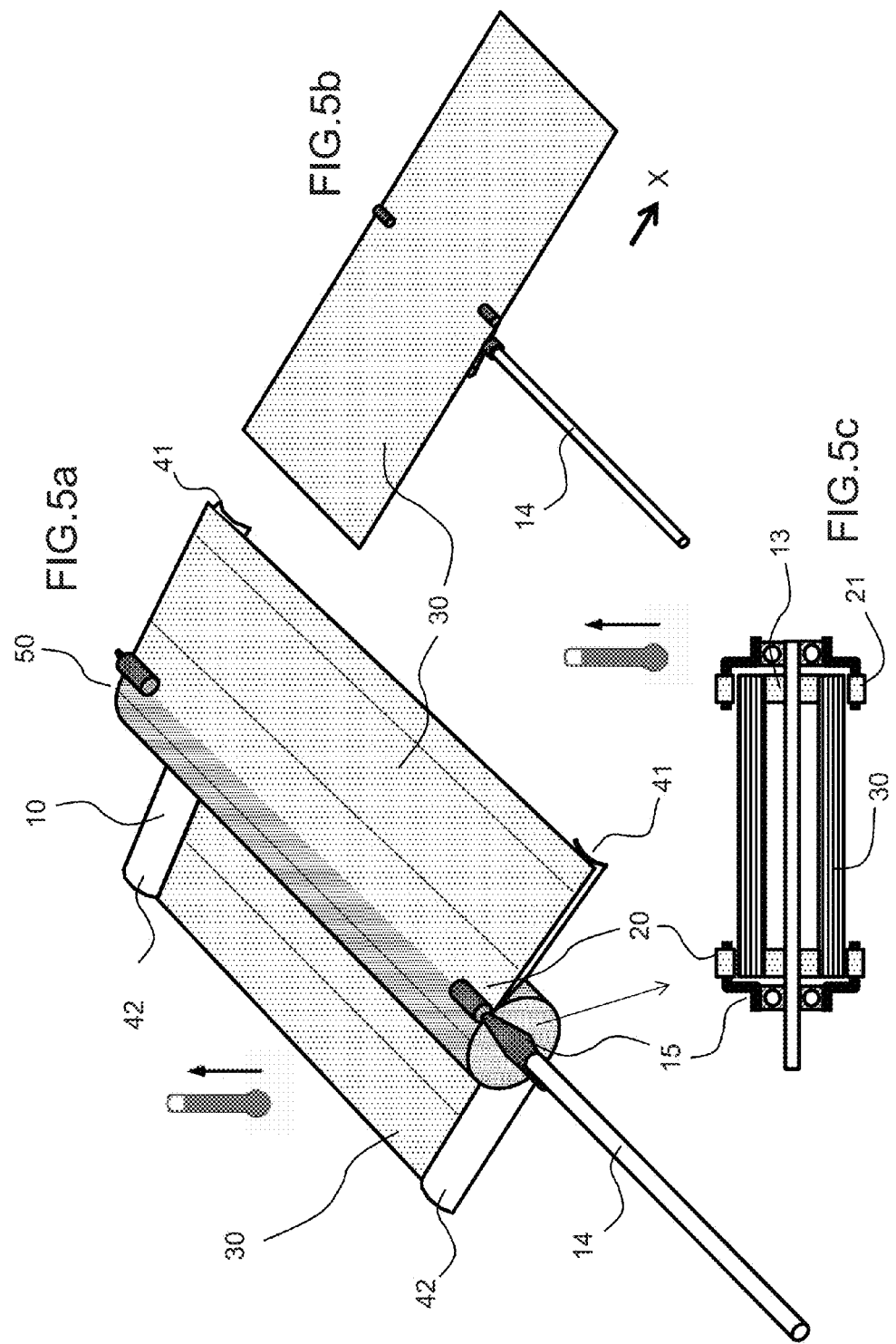

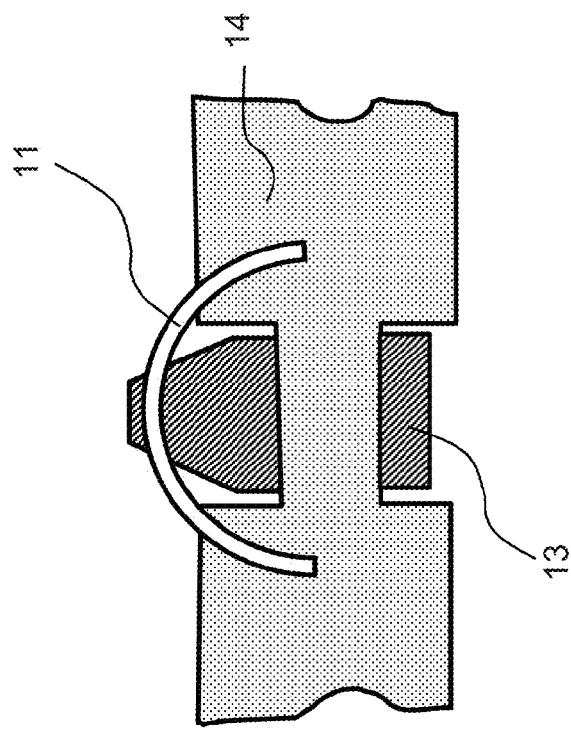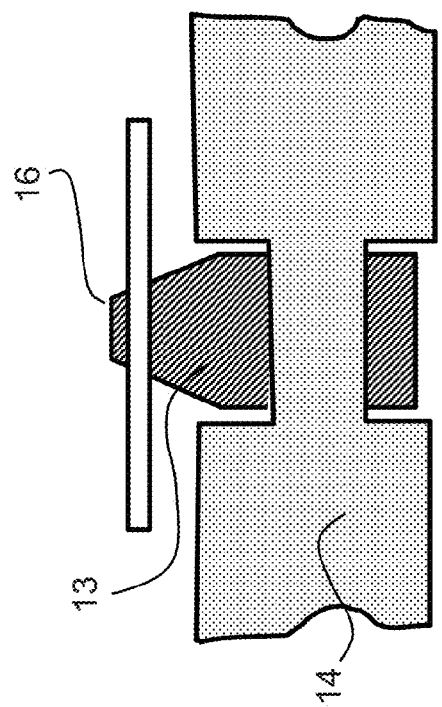
FIG.7

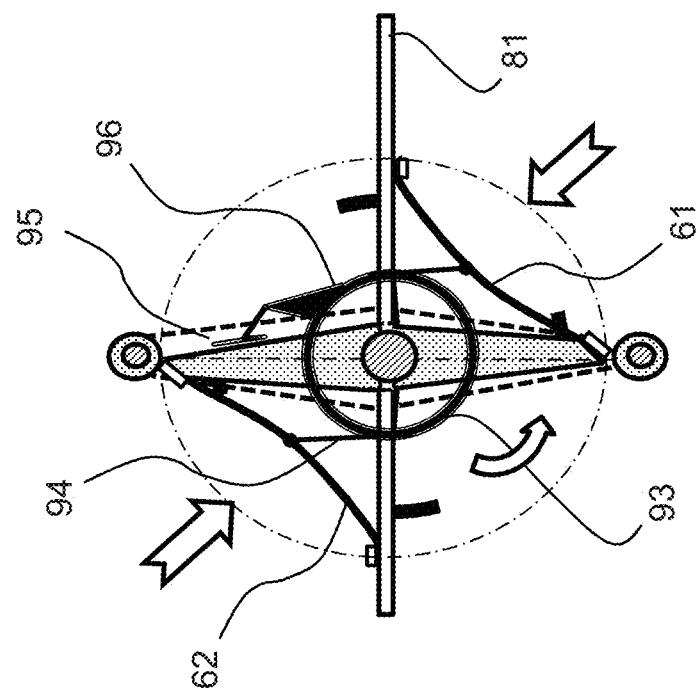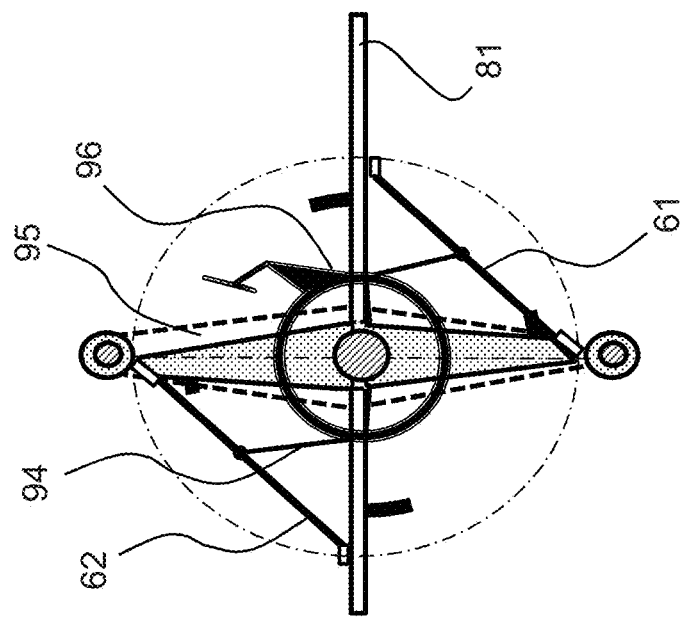
FIG.10

TAPE SPRING DEPLOYABLE STRUCTURE

CROSS-REFERENCE TO RELATED APPLICATION

This application claims priority to foreign French patent application No. FR 1401712, filed on Jul. 25, 2014, the disclosure of which is incorporated by reference in its entirety.

FIELD OF THE INVENTION

The present invention relates to a tape spring deployable structure for a roll-up and deployable flexible structure. It applies notably to the field of space equipment that has to be deployed in orbit and more particularly to space equipment for satellites such as antennas, solar generators, heat screens, baffles or telescopes.

BACKGROUND

Structures deployable in space, of the solar generator type for example, are generally made up of rigid panels articulated to one another, these panels when in the stored position being stacked on top of one another. These structures have the advantage of having dynamic behaviour that is fully controlled but have the disadvantage of having a high inertia and a mass per unit area. Furthermore, rigid structures when in a stored position occupy a significant amount of space under the cap of a launcher. Because the amount of space allocated to deployable structures under the cap of a launcher is limited, it is important to reduce the space occupied by these deployable structures when they are in the stored position, so as to optimize the surface area they represent in the deployed position.

There are deployable flexible planar structures that comprise a flexible fabric and tape springs fixed to one and the same plane of the fabric. In the stored position, the fabric and the tape springs are wound around a mandrel. Deployment of the flexible planar structure is brought about autonomously by the spontaneous unwinding of the tape springs when the mandrel is free to rotate.

Indeed tape springs are known in the field of space as being flexible tapes with a circular arc-shaped cross section the radius of curvature of which circular arc is convex on a first face and concave on a second face, these tapes being able to pass from the wound state to the unwound state essentially through their own elastic energy. There are various types of tape that have their own properties. Monostable tapes have a deployed natural position and need to be held in the stored position. Monostable tape springs therefore have a natural tendency to deploy in order to regain their unwound state. The deployment of monostable tapes is often disorganized and uncontrolled. Bistable tapes have two natural positions (stored position and deployed position) and do not need to be held in the stored position when the cross section is fully flattened. Their deployment is linear and controlled. However, in both instances, when deployment is initiated it may be violent and generate shocks, which means to say that the entire tape spring may have a tendency to straighten out simultaneously, over its entire length, presenting a problem of damage to surrounding elements or elements fixed to the tape spring such as a flexible membrane, an instrument, an antenna, etc. Conventional tape springs may thus present difficulties in terms of controlling their deployment. In order to regulate the speed of deployment of this type of structure there are a number of methods that can be used. Mention may for example be made of regulation using an electric geared motor unit as described in patent application FR12/03300 or thermal regulation using hybrid tape springs as described in patents FR 0803986 and U.S. Pat. No. 7,856,735.

Furthermore, the stiffness of the tape springs varies according to the axis of stressing. A force F applied to the convex face of the tape spring will have a tendency to cause the tape spring to flex, whereas the same force applied to the concave face will have no effect, and this presents a problem of instability of the flexible structure in its deployed state. In order to address this problem of stability in the deployed state, it is therefore necessary for the tape spring to be kept in the deployed position by an additional retaining means or for the tape spring to be over-engineered so that it remains stable under the orbital forces, whatever the direction in which these are applied.

Thus, in the stored configuration, the tape spring needs to be as compact as possible, which means to say that it needs to have the smallest possible radius of winding. This parameter is given by the physical characteristics of the tape, in general the radius of winding is substantially equal to that of their radius of curvature. In the case of a composite tape, it may be altered by changing the order of stacking of the plies and/or the direction of the fibres. In the deployed configuration, the best possible rigidity is sought, which means the largest and most closed cross section possible, combined with the end of the tape spring being built in as far as possible.

SUMMARY OF THE INVENTION

The invention seeks to alleviate all or some of the problems mentioned hereinabove by proposing a deployable structure for a flexible roll-up and deployable structure, having the advantage of occupying very little space, being simple to produce, optimizing the volume of the deployable structure when it is stored under the cap of a launcher, allowing control over deployment and the ability to refurl and allowing the structure rigidity and stability when deployed To this end, one subject of the invention is a deployable structure comprising:

a support, a tape spring fixed to the support, able to pass from a wound configuration wound about an axis Z, to a deployed configuration, characterized in that it further comprises a mobile arm able to rotate with respect to the support about the Z-axis, able to form a first contact with the tape spring so as to control the deployment of the tape spring.

According to one embodiment, with the tape spring having two ends, the tape spring is fixed between its two ends to a fixing point on the support, the arm is able to form a second contact with the tape spring so as to control the deployment of the tape spring, a first end is able to deploy with respect to the fixing point along a first axis perpendicular to the Z axis in a first direction, and a second end is able to unfold along a second axis perpendicular to the Z axis in a second direction different from the first direction.

Advantageously, the two ends are able to deploy simultaneously.

According to another embodiment, the deployable structure according to the invention may further comprise a mandrel and a shaft that is substantially parallel to the Z axis, the mandrel is fixed on the shaft, and the tape spring is wound around the mandrel.

According to another embodiment, the arm bears two rollers, the rollers being in contact with the tape spring and the rollers are able to guide the tape spring.

Advantageously, the rollers may be heating rollers which are able to locally heat the tape spring.

Advantageously, the deployable structure may further comprise a locking means for locking the degree of freedom of rotation of the arm about the Z axis.

Advantageously, the locking means for locking the degree of freedom of rotation about the Z axis may be that a portion of the tape spring is set into the shaft.

According to another embodiment, the deployable structure according to the invention may comprise two secondary tape springs each one comprising two ends, a first end of one of the two secondary tape springs is fixed some distance away from a first end of the tape spring and a second end of the secondary tape spring is fixed to one end of the arm.

Advantageously, the secondary tape springs may be flat blades.

Advantageously, the structure may further comprise a deployable articulated mast fixed on a platform of a satellite via a rotation-drive motor.

The invention also relates to a satellite comprising at least one deployable structure.

BRIEF DESCRIPTION OF THE DRAWINGS

The invention will be better understood and further advantages will become apparent from reading the detailed description of one embodiment given by way of example, which description is illustrated by the attached drawing in which:

FIGS. 2a, 2b and 2c depict a deployable structure in a view in cross section of the deployable structure according to the invention, FIG. 4a is an isometric view of the deployable structure according to a first embodiment, FIG. 4b is a view in cross section of the deployable structure according to a first embodiment, FIGS. 5a, 5b and 5c depict a deployable structure in the semi-deployed position and in the deployed position and a cross section of the deployable structure according to one embodiment, FIG. 7 depicts a locking means for locking the tape spring in the deployed position, FIG. 10 depicts a means of automatically buckling the secondary tape springs, FIG. 11 schematically depicts a satellite comprising at least one deployable structure according to the invention.

DETAILED DESCRIPTION

For the sake of clarity, the same elements will bear the same references in the various figures.

Figure 1C:
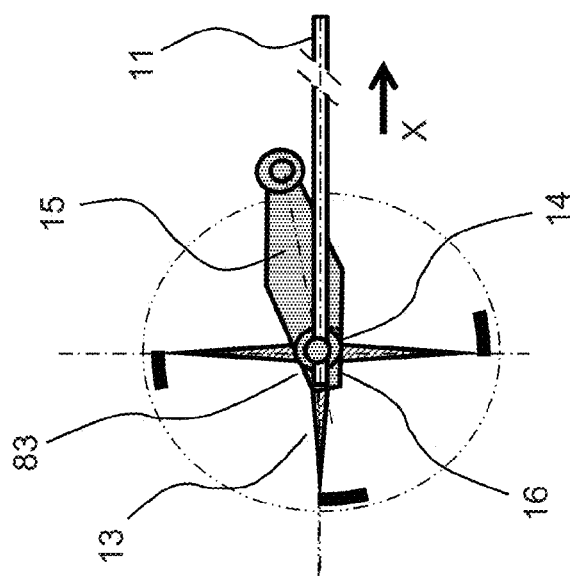
FIGS. 1a, 1b and 1c are three diagrams, in section on a plane perpendicular to the Z axis, of a deployable structure according to the invention.
Figure 1B:
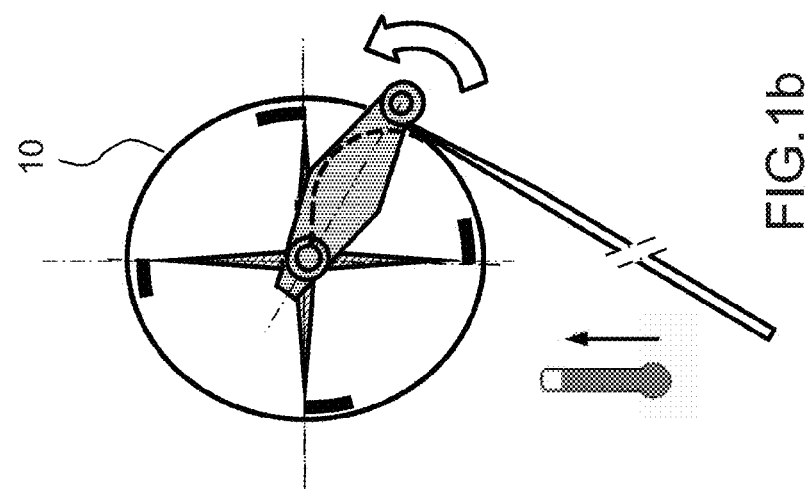
Figure 1A:
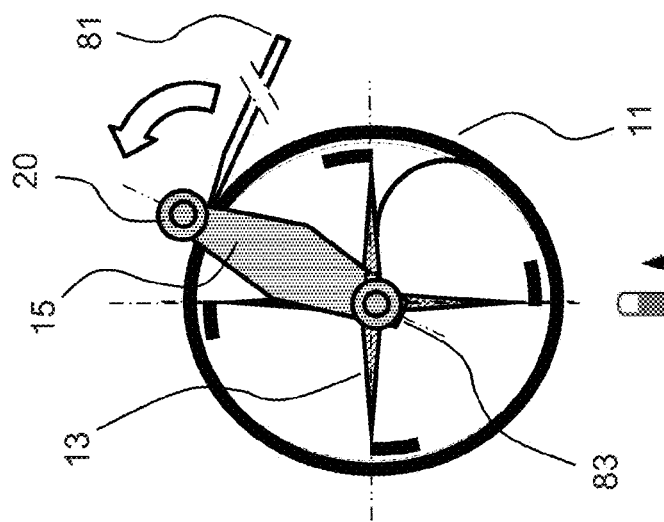

FIGS. 1a, 1b and 1c are three diagrams, in cross section on a plane perpendicular to a Z axis, of the deployable structure 10 according to the invention. The deployable structure 10 comprises a support 16 and a tape spring 11 fixed to the support 16, able to pass from a wound configuration in which it is wound about an axis Z into a deployed configuration along an unfurled axis X. The structure 10 further comprises a mobile arm 15 able to rotate with respect to the support 16 about the Z axis, able to form a first contact with the tape spring 11 so as to control the deployment of the tape spring 11. The first contact may be a point contact or alternatively a longitudinal contact along an axis substantially parallel to the Z axis, along the entire width of the tape spring 11 or just part of the width of the tape spring 11. Indeed without this contact the tape spring could deploy uncontrolled along any arbitrary axis. This contact may easily be replaced by at least one roller 20, borne by the arm 15. This roller 20 may have a degree of freedom to rotate about an axis parallel to the Z axis, allowing it to rotate at the surface of the tape spring 11. The arm 15 makes it possible to control the deployment of the tape spring using a resistive torque which varies according to the type (hybrid or electrical*) of regulation selected. The contact is advantageously positioned near the wound part of the tape spring 11 so as to contribute to holding the tape spring 11 in its wound part.

The deployable structure 10 according to the invention may further comprise a mandrel 13 and a shaft 14 substantially parallel to the Z axis. The mandrel 13 may be fixed to the shaft 14 and the tape spring 11 may be wound around the mandrel 13. The support 16 may be connected to the shaft 14. It is not indispensible for the mandrel 13 to be present. Nevertheless, such a configuration allows the tape spring 11 to be positioned and guided properly between the mandrel 13 and the roller 20.

The tape spring 11 has two ends 81, 83. The tape spring 11 is fixed at its end 83, to the shaft 14 in the region of the support 16. According to the invention, the tape spring 11 is able to deploy in a direction parallel to an X axis that is perpendicular to the Z axis. The tape spring is wound on a diameter corresponding to the diameter of the mandrel 13. Diagram 1c illustrates the deployable structure 10 in the fully deployed position. The tape spring 11 is fully deployed along the X axis and still fixed at its end to the shaft 14.

FIGS. 2a, 2b and 2c are three diagrams, in cross section on a plane perpendicular to a Z axis, of the deployable structure 10 according to the invention. The deployable structure 10 comprises at least one tape spring 11 having an axis of deployment and refurling that is substantially parallel to an unfurled axis X and a winding mandrel 13 borne by a shaft 14 along the Z axis perpendicular to the X axis. The tape spring 11 has two ends 81, 82. The tape spring 11 is fixed between its two ends 81, 82 to a point of fixing at the support 16 (preferably at the middle of the tape spring 11), on the shaft 14. The arm 15 is able to form a second contact with the tape spring 11 along an axis substantially parallel to the Z axis, so as to guide the tape spring 11 and control the deployment thereof, a first end 81 is able to deploy with respect to the fixing point along a first unfurled axis X perpendicular to the Z axis in a first direction, a second end 82 is able to unfurl along a second axis perpendicular to the Z axis in a second direction different from the first direction. In certain configurations, the second direction may be the opposite of the first direction.

The tape spring 11 may be wound around the mandrel 13 physically connected to the shaft 14. The two ends 81, 82 are able to deploy with respect to the fixing point 16, each of them in directions parallel to the X axis and diametrically opposed. Thus, the two ends 81 and 82 of the tape spring 12 are stored by winding in one and the same direction. This configuration makes it possible to obtain a winding of a tape spring on a diameter corresponding to the diameter of the mandrel 13. This configuration is therefore optimized for storage because it takes up very little space and allows optimized unwinding because several lengths of tape are deployed or refurled simultaneously.

Moreover, the two ends 81, 82 are able to deploy simultaneously.

Diagram 2c illustrates the deployable structure 10 in the fully deployed position. The tape spring 11 is fully deployed along the axis X and still fixed at its middle to the interface 16.

Figure 3B:
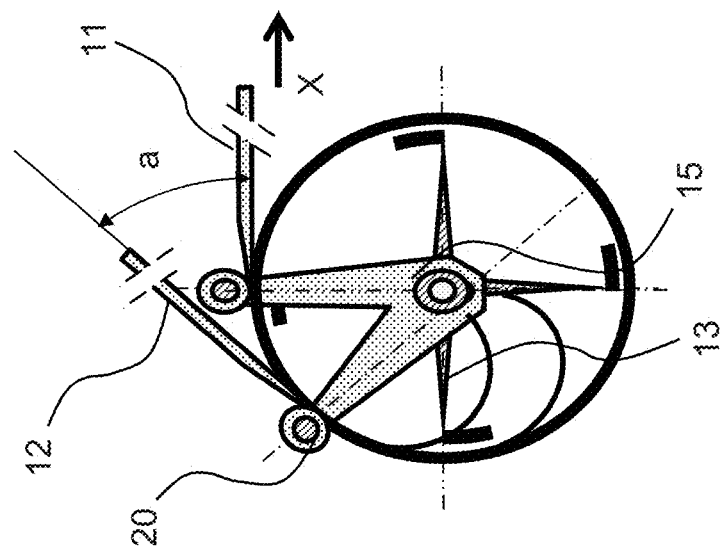
FIGS. 3a and 3b depict a deployable structure in a view in cross section of the deployable structure according to the invention.
Figure 3A:
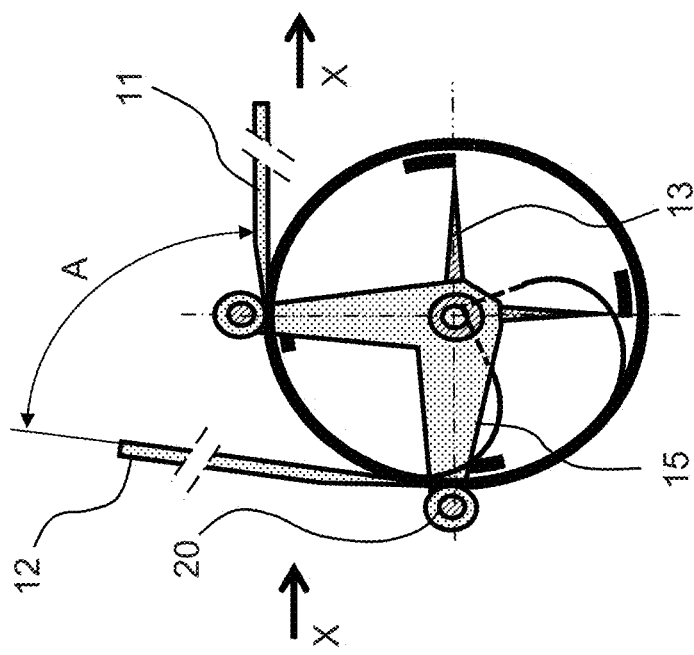

FIG. 3 depicts two diagrams annotated 3a and 3b respectively, in cross section on a plane perpendicular to a Z axis, of the deployable structure 10 according to the invention. The roll-up and deployable tape spring deployable structure 10 for a flexible structure comprises at least two tape springs 11 and 12 each having an axis of deployment and of refurling that makes any angle with respect to the axis of deployment X of the first tape spring 11.

FIG. 4a depicts the deployable structure 10 in an isometric view and FIG. 4b depicts the deployable structure in cross section. The arm 15 is guided in rotation about the shaft 14 in the region of the support 16. The arm 15 may form two contacts substantially parallel to the shaft 14 and which may be symmetric with one another with respect to the shaft 14, the arm being able to control the deployment of the tape spring 11.

In FIG. 4b, the deployable structure 10 further comprises at least two rollers 20, 21 borne by the arm 15. The rollers 20, 21 are in contact with the tape spring 11. The arm 15 has a degree of freedom to rotate about the Z axis. The rollers 20, 21 are able to guide the tape spring 11. The two rollers 20, 21 notably allow the tape spring 11 to unwind correctly and in synchronism about the mandrel 13 and also, if the arm 15 is motorized, allow the tape spring to be refurled on the ground or in flight, for example when the flexible structure is mounted on a satellite. In addition, the rollers 20, 21 make it possible to limit the friction between the arm 15 and the tape spring 11.

The invention may be applied to hybrid tape springs consisting of a motive first structure (for example made of carbon fibre) that allows the tape spring to deploy, and a regulating part (thermoelastic or made of a material that has a transition temperature notably below that of the main tape) that encourages or limits deployment as a function of the temperature applied to it. By using a natural phenomenon whereby the viscosity of a material changes with temperature, good reliability and repeatability of how the deployment is regulated are guaranteed.

It may be noted that in the case of the use of hybrid tape springs refurling simply using the force of the tape spring is impossible because the tape spring is motive in the direction of deployment only. In order to allow the tape spring to be refurled, an electric geared motor unit needs to be added to it. As a result, if a one-shot deployment is desired, it is possible to have hybrid or electric regulation and/or motorization. If multiple deployments of the tape spring are to be envisioned, the regulation and/or drive will thus need to be electrical.

To regulate the deployment of the tape spring 11, in the case of the use of hybrid tape springs, it is possible to heat the mandrel 13. Advantageously, the rollers 20, 21 may be heating rollers. The heating rollers allow the tape springs to be warmed up locally at two points, their respective anchor points, thus causing them to deploy and also causing the mandrel 13 to rotate which can therefore heat the cross section of tape spring then brought into contact with the rollers 20, 21, as indicated schematically in FIG. 1b, the arrows indicating the rotation about the Z axis. The local heating by the heating rollers makes it possible to obtain regulated deployment of the structure. In addition, because the heating is local, this configuration is energetically economical because there is no need to heat the entire tape spring and/or the entire mandrel 13. This feature is particularly beneficial for use on a satellite.

FIGS. 5a, 5b and 5c depict a deployable structure 50 in the semi-deployed position and in the deployed position and a cross section through the deployable structure 50 comprising two deployable structures 10 according to a first embodiment. The deployable structure 50 may comprise at least one flexible membrane 30. In FIGS. 5a, 5b and 5c, the deployable structures 10 according to the invention respectively comprise two tape springs 41 and 42. The flexible membrane 30 may be intended to support elements that are to be deployed, such as solar cells, metalized cells for reflecting radiowaves, insulating elements for creating a heat screen or optical screen, for example, or any other device. The flexible membrane 30 is fixed to the tape springs 41, 42. The flexible membrane 30 may be stiffened by transverse straps themselves fixed to the tape springs, for example by bonding, riveting, stapling or stitching.

FIG. 5c depicts a cross section of the deployable structure 50 comprising two deployable structures 10 according to a first embodiment, and of a flexible membrane 30. In FIG. 5c, the mandrel 13 is fixed to the shaft 14. The arm 15 has a degree of freedom to rotate about the Z axis. This embodiment requires a rotary electric power supply system of the slip rings type or of spiral-wound cable type to power the heating rollers. It is more suited to a system of heating mandrel 13 that is fixed with respect to the shaft 14 and uses no slip rings. It is also possible to consider another embodiment, as set out in FIG. 6.

It should be noted that the deployable structure 50 has been depicted with two tape springs. Nevertheless, it is possible to apply the invention to a deployable structure having more than two tape springs, for example three or four, notably in order to obtain in this way better support of the flexible membrane or when the flexible membrane has a very large surface area.

Figure 6:
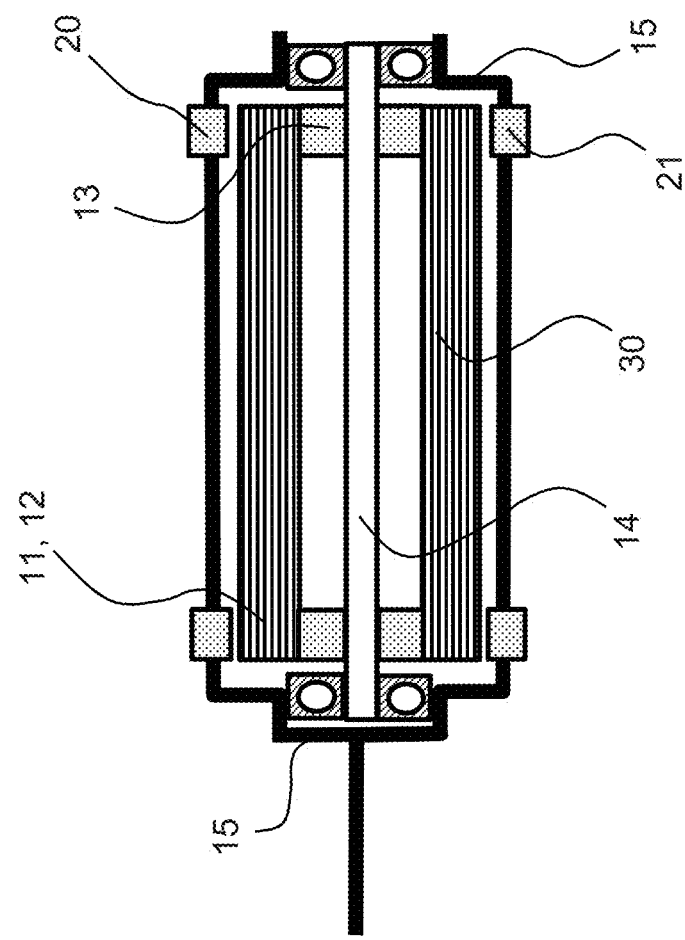
FIG. 6 depicts a cross section of the deployable structure according to one embodiment.

FIG. 6 is a cross section through the deployable structure 50 comprising two depolyable structures 11, 12 according to a first embodiment. In FIG. 6, the mandrel 13 is fixed on the shaft 14 and both have a degree of freedom to rotate about the Z axis. The arm 15 is fixed.

This embodiment does not require a rotary electrical power supply system of the slip rings or spiral-wound cable type to power the heating rollers. In this embodiment, there is no longer any need to compensate for the turns of tape springs. Nevertheless, it is necessary to lock the rotation of each tape spring at the end of deployment of the deployable structure 10.

FIG. 7 depicts a means for locking the degree of freedom to rotate about the Z axis of the tape spring in the deployed position. The means for locking the degree of freedom to rotate about the Z axis is that a portion of the tape spring is set into the shaft 14. In the region of the mandrel 13, the tape spring 11 can regain its initial position with a slightly concave shape of the face fixed to the mandrel 13 which therefore sets into the shaft 14. In other words, the tape spring 11 fits onto the shaft 14 like a key. Rotation of the tape spring about the Z axis is therefore locked.

Figure 8:
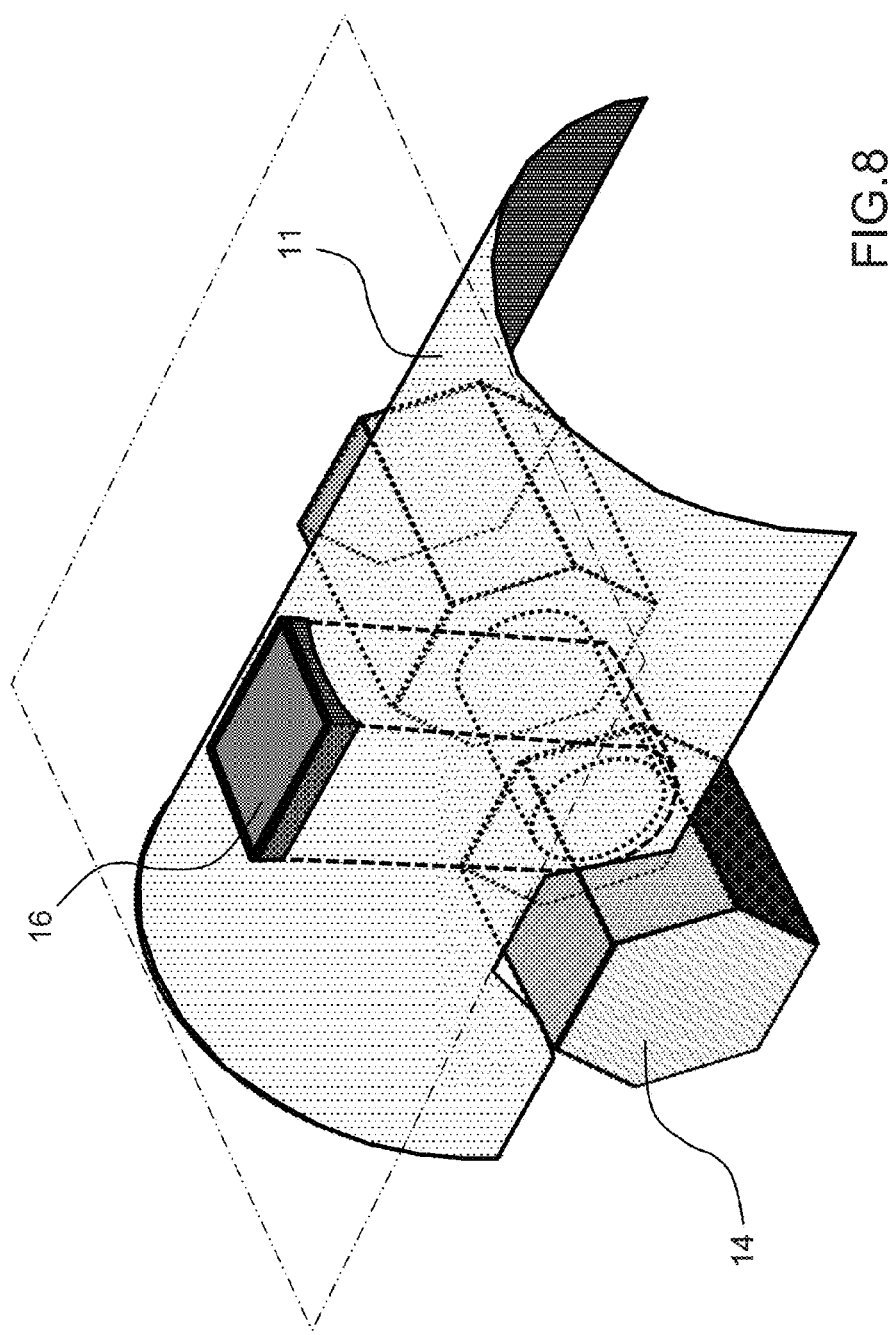
FIG. 8 illustrates, showing some of the hidden detail, the locking means for locking the tape spring on the mandrel.

FIG. 8 illustrates an isometric view showing some hidden detail of the means of locking the tape spring on the mandrel 13, including detail of the curvature of the tape spring set into the shaft 14.

Figure 9:
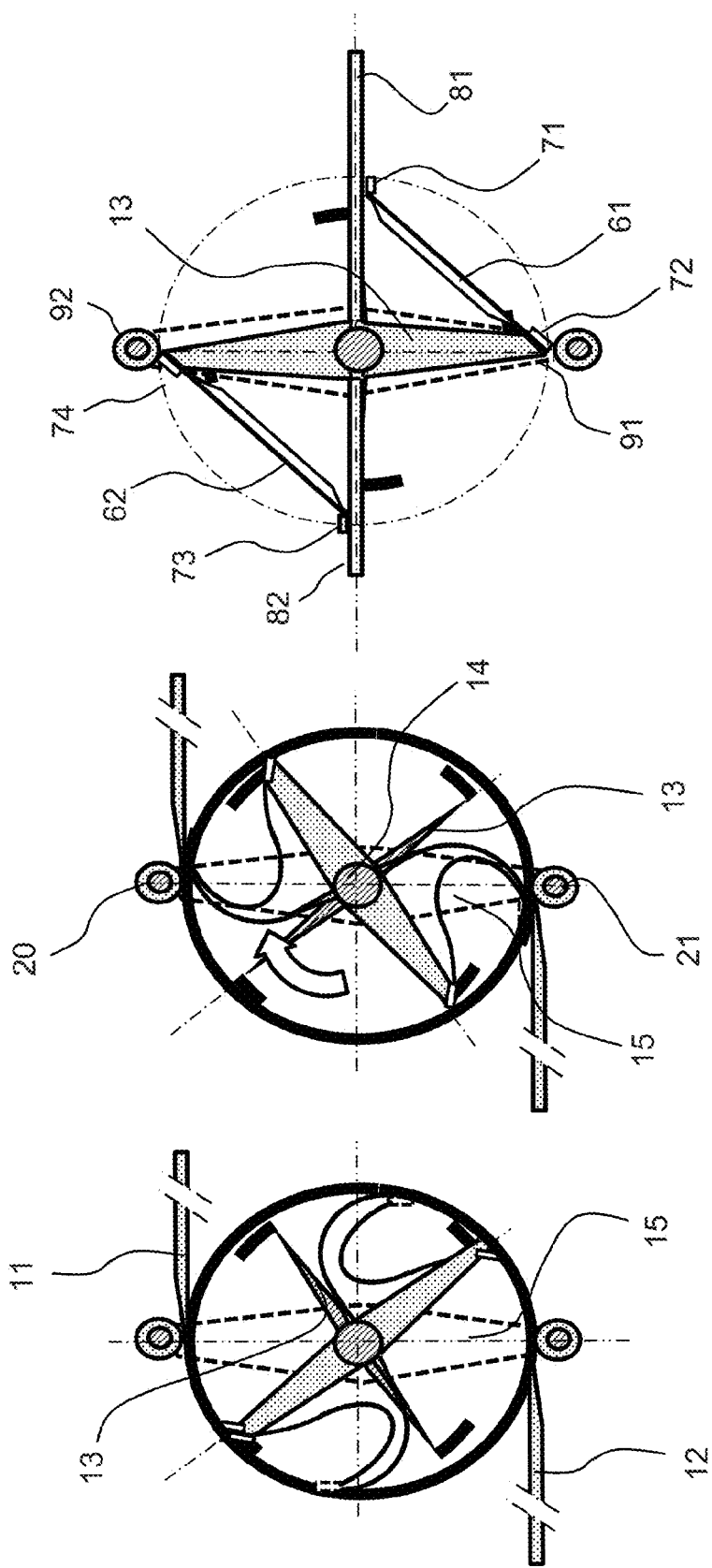
FIG. 9 depicts another way of making the insetting of the tape spring more rigid.

FIG. 9 depicts another way of making the insetting of the tape spring more rigid. This configuration is similar to the one proposed in FIG. 8 with an arm 15 bearing the rollers 20, 21 that is fixed, and a shaft 14, a mandrel 13 and tape springs 11 and 12 that have rotational mobility about the Z axis.

The tape spring 11 and the mandrel 13 each have two ends. The deployable structure 10 comprises two secondary tape springs 61, 62 each having two ends, a first end 71 of one of the two secondary tape springs 61 is fixed some distance from a first end 81 of the tape spring 11. A second end 72 of the secondary tape spring 61 is fixed to an end 91 of the mandrel 13. Likewise, a first end 73 of the second secondary tape spring 62 is fixed some distance from a second end 82 of the tape spring 11. A second end 74 of the secondary tape spring 62 is fixed to one end 92 of the mandrel 13. Each assembly made up of a portion of tape spring, a portion of mandrel and a secondary tape spring forms, when in the deployed position, a triagulated structure that offers the deployed tape spring excellent rigidity.

In FIG. 9, the arm 15 is depicted in dotted line, but it is quite clear that it is connected to the heating rollers 20, 21 in order to allow good guidance of the tape spring and deployment of the tape spring by local heating as explained hereinabove. Thus, the deployment of the tape spring can be regulated and controlled.

The secondary tape springs may be tape springs of convex cross section or flat blades.

A tape spring in the deployed configuration offers good tensile strength and also good compressive strength (within certain limits). It can therefore be used alone like a "strut" as described hereinabove. However, its capacity for being stored is not so good as that of a strip, because of this bulkier insetting.

In order to save space in the stored position and allow for winding, it may therefore be conceivable to use cables, flat blades or flexible strips in place of the tape springs. However, these work in tension only. They therefore need to work in pairs placed in opposition (as depicted in FIG. 9), using the stiffness of the main tape spring. This is because when torque is applied to the main tape spring one flexible strip opposes the force whereas if a torque is applied in the other direction, it is the opposite flexible strip that acts.

The secondary tape springs constitute a triangular system on the tape spring 11.

When it is desired to refurl the flexible structure 30 into the configuration depicted in FIG. 9, all that is required is for the secondary tape spring or tape springs to be made to buckle so that they wind up as initially, by applying a force at the middle of the tape 61, normal to the axis thereof.

FIG. 10 depicts a means 96 for automatically buckling the secondary tape springs 61, 62. The buckling force may be obtained by a motor that allows the structure to be rewound. The motor is connected to a pulley 93 which, via cables or strip 94, drives the tape springs 61, 62. When the pulley 93, via a stop piece 95, comes into contact with the mandrel 13, the motor drives the mandrel 13 so as to rewind the structure.

Figure 11:
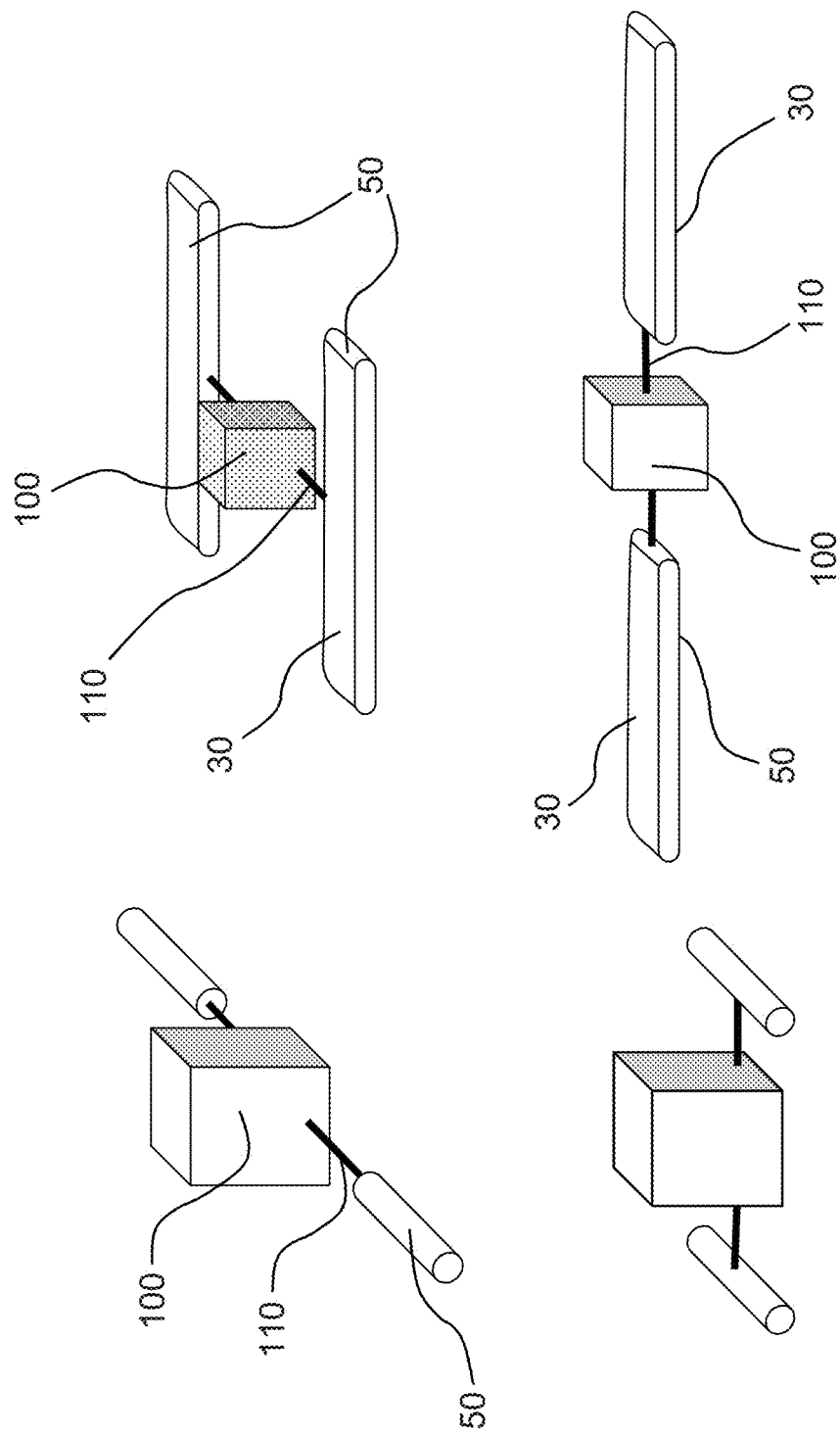

FIG. 11 depicts a satellite 100 comprising at least one deployable structure 50 equipped with a flexible membrane 30 and with at least 2 deployable structures 10. The deployable structure 50 further comprises a deployable articulated mast 110 fixed to a platform of the satellite 100 via, for example, a rotation-drive motor. In FIG. 10, the flexible membrane 30 is fully deployed. The satellite 100 comprises a second flexible membrane 30. The two deployable structures 50 are positioned one on each side of the satellite 100. The flexible structure 50 may be positioned in a T configuration relative to the satellite 100 (the configuration depicted in FIG. 2), which means to say that its longitudinal main direction is perpendicular to the articulated mast 110. The flexible structure may also be positioned in an I-shape (the configuration depicted in FIG. 1) with respect to the satellite 100, which means to say that its main longitudinal direction is in the continuation of the articulated mast 110.

In general, in actual use, the deployable structure 50 is used for just one deployment. However, further mission requirements are arising. Notably the transfer or towing of a satellite from a low orbit to a high orbit. At the time of docking, for steering the transfer vehicle, the lowest possible amount of inertia is required, which means to say that the presence of large-sized deployable structures is unfavourable. It is also necessary to avoid any interference with the satellites that are to be docked. As a result, it is preferable to roll up the deployable structures. When the satellite has been docked, the structure can be deployed again.

The invention allows simplicity of assembly having few components to assemble. Unwinding of the tape spring is well controlled. Specifically, the tape spring can be guided by the rollers 20, 21 and locally heated if the rollers 20, 21 are heating rollers, thus allowing its deployment to be regulated.

Finally, stacking may be autonomous because it is obtained by the bistable nature of the (hybrid or otherwise) tape spring that has two stable positions (wound and deployed).

However, the invention may also be applied to non-hybrid or non-bistable tape springs.

In that case, deployment is regulated by a geared motor unit (which restrains the torque of the tape spring) in place of the (thermoplastic/heating rollers) pairing.

The invention claimed is:

1. A deployable structure, comprising:
   a support,
   a tape spring fixed to the support, able to pass from a wound configuration wound about an axis Z, to a deployed configuration, the tape spring having two ends,
   a mobile arm able to rotate with respect to the support about the Z-axis, able to form a first contact with the tape spring so as to control the deployment of the tape spring, wherein the tape spring is fixed between its two ends to a single fixing point on the support,
   wherein the arm is able to form a second contact with the tape spring so as to control the deployment of the tape spring,
   wherein a first end of the tape spring is able to deploy with respect to the single fixing point along a first axis perpendicular to the Z axis in a first direction, and
   a second end of the tape spring is able to simultaneously unfold along a second axis perpendicular to the Z axis in a second direction different from the first direction.

2. The deployable structure according to claim 1, wherein the arm bears two rollers, the rollers being in contact with the tape spring and in that the rollers are able to guide the tape spring.

3. The deployable structure according to claim 2, further comprising a locking means for locking the degree of freedom of rotation of the arm about the Z axis.

4. The deployable structure according to claim 3, the arm comprising two ends and a mandrel comprising two ends, wherein the structure comprises two secondary tape springs each one comprising two ends, a first end of one of the two secondary tape springs is fixed some distance away from a first end of the tape spring and a second end of the secondary tape spring is fixed to one end of the mandrel.

5. The deployable structure according to claim 4, wherein the secondary tape springs are flat blades.

\* \* \* \* \*